Jan. 14, 1936.  C. M. ROACH  2,027,402
ELECTRIC GENERATOR
Filed April 24, 1934  2 Sheets-Sheet 1
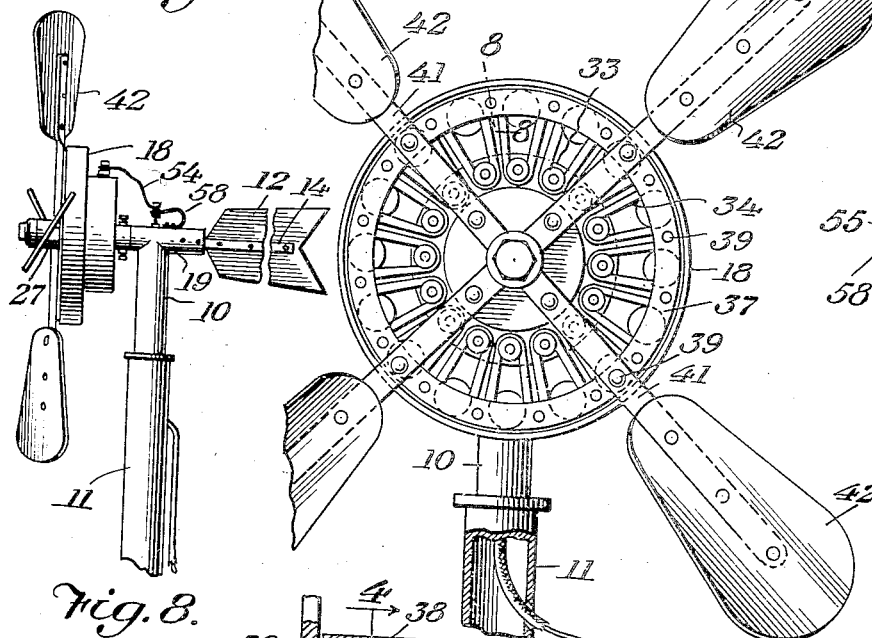
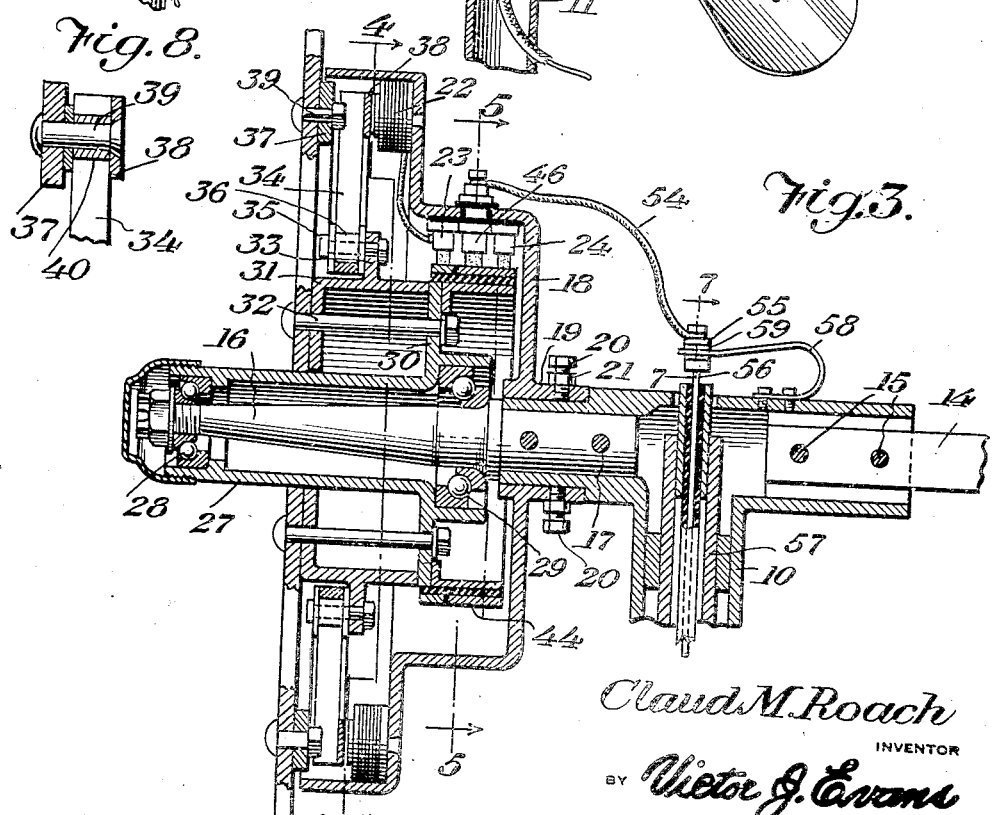
Claud M. Roach
INVENTOR
BY Victor J. Evans and Co.
ATTORNEYS Jan. 14, 1936.   C. M. ROACH   2,027,402
ELECTRIC GENERATOR
Filed April 24, 1934   2 Sheets-Sheet 2

Claud M. Roach
INVENTOR
BY Victor J. Evans and Co.
ATTORNEYS

Patented Jan. 14, 1936

2,027,402

UNITED STATES PATENT OFFICE 2,027,402

ELECTRIC GENERATOR

Claud M. Roach, San Saba, Tex.

Application April 24, 1934, Serial No. 722,169

1 Claim. (Cl. 171—252)

The object of the invention is to provide an electric generator adapted to utilize the wind as a source of power to supply an electric power load by reason of charging a storage battery when the wind currents are high, so that an electrical power source may be provided for use as needed; and to provide an electric power apparatus of the kind indicated which is of comparatively simple form, of a character not likely to get out of order in use and susceptible of cheap manufacture and easy replacement of worn or damaged parts.

With this object in view, the invention consists in a construction and combination of parts of which a preferred embodiment is illustrated in the accompanying drawings, wherein:

Figure 1 is a side elevational view of the invention.

Figure 2 is a front elevational view, partly broken away.

Figure 3 is a vertical diametrical sectional view.

Figure 4:
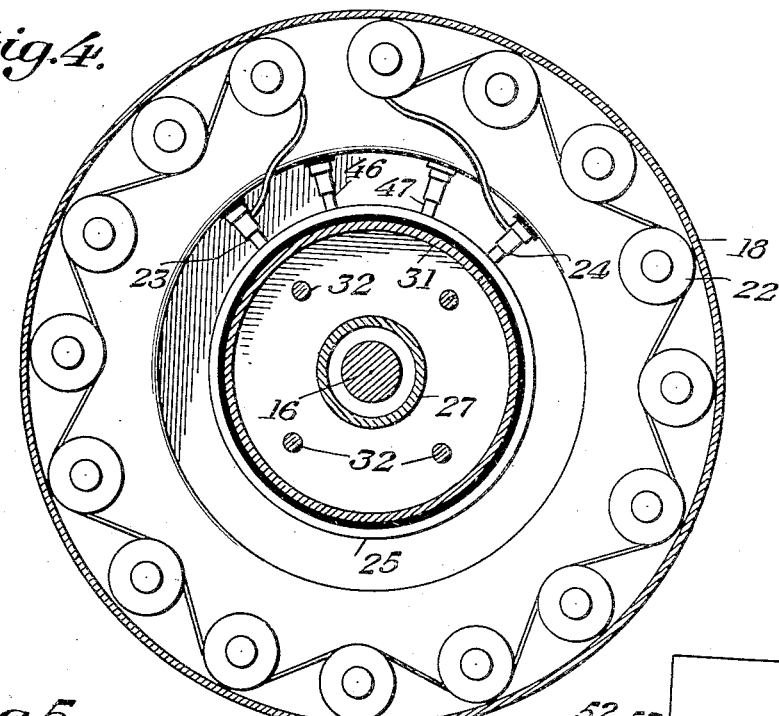
Figure 5:
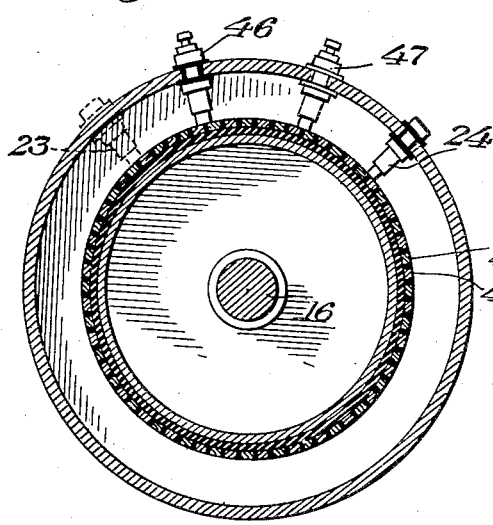

Figures 4 and 5 are sectional views on the planes indicated by the lines 4—4 and 5—5 respectively of Figure 3.

Figure 6:
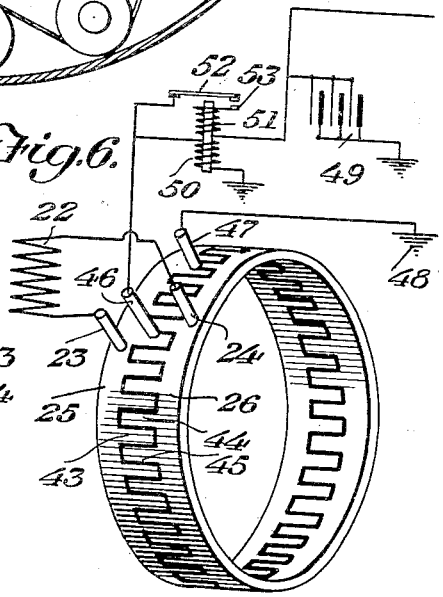

Figure 6 is a diagrammatic view of the electrical circuit.

Figure 7 is a sectional view on the plane indicated by the line 7—7 of Figure 3.

Figure 8 is a section on the line 8—8 of Figure 2.

The invention comprises an electrical generator formed as a part of a windmill and mounted upon a T-shaped head 10 of which the vertical leg has a pivotal mounting in the upper end of a standard 11, the generator being mounted at the extremity of one of the cross legs and the vane 12 at the extremity of the other cross leg. The head 10 is of the hollow form and the vane 12 is mounted by having its stem 14 telescoped into the head and secured in place therein by fastening means such as rivets 15.

The rotary member of the generator is mounted on a stub shaft 16 telescoping its leg of the head and rigidly secured in place by fasteners such as rivets 17.

The stationary member of the generator or stator is in the form of a stepped cylindrical housing or case 18 formed with a hub portion 19 telescoped over its leg of the head and locked in place thereon by set screws 20 and associated jamb nuts 21.

The generator comprises a rotary field system and stationary armature, the latter being in the form of spools or bobbins 22 of wire with associated soft iron cores, these spools being mounted in a circular series on the flat wall of the larger section of the case 18 and serially connected, the terminals being brought out to brush holders 23 and 24 which are mounted in the cylindrical wall of the smaller section of the case and which bear respectively on collector rings 25 and 26. The brushes 23 and 24 comprise the conventional holders and associated ring bearing members, the holders being insulated from the case where they are mounted in the latter. The current generated in the windings of the bobbins or spools 22 is thus conducted to the collector rings. The rotary field comprises a cylindrical shell 27 mounted on the stub shaft 16 on which it freely rotates by reason of the anti-friction bearings 28 and 29. The shell 27 is formed with an annular flange 30 which serves as a mounting means for an annular shell 31 which is secured in place in surrounding relation to the shell 27 by means of bolts 32. The shell 31 is formed with a centrally arranged circumferential flange 33 which serves as a mounting means for the permanent magnets 34, these magnets being of the horseshoe type and secured to the flange 33 by bolts 35 which pass through bushings 36 seated in the crotches of the magnets, washers being disposed between the magnets and the flange 33 and between the magnets and the heads of the bolts 35.

By reason of this construction, the magnets are arranged radially and uniform spacing of their polar extremities is secured by means of a spacer ring 37 which is non-magnetic and which functions, in conjunction with a second spacer ring 38, to secure the proper spacing of the polar extremities of the magnets. The two spacer rings are connected by fasteners 39 carrying the collar members 40 which are disposed between the adjacent legs of adjacent magnets but which lie flat against the spacer ring 37.

The arms 41 which carry the sails 42 are secured in their radial positions by the bolts 32 and by certain of the fasteners 39.

The collector rings 25 and 26 are laterally notched on their facing edges to provide the segments 43 and 44 respectively, the segments being uniformly spaced so that the two rings may be laterally joined to provide a series of intercurrent segments separated by insulation 45. The output brushes 46 and 47 are arranged on a central circumferential line of the assembled collector rings, so as to bear on the segments and are angularly spaced in order that when one brush bears on one of the segments 43, the other will bear on one of the segments 44. The brushes 46 and 47 are mounted also in the cylindrical wall of the smaller section of the case, the brush 46 being preferably insulated from the case but the brush 47 directly connected with the case so as to provide a ground connection, diagrammatically indicated at 48 in Figure 6.

The apparatus is designed to be used in connection with a battery, such as indicated at 49, one terminal of that being grounded but the other terminal leading to one side of the service line of which the other side is grounded. The brush 47 is connected to the shunt winding 50 of a charging control, the other side of said shunt winding being grounded. The charging relay includes the series winding 51 which is connected to the ungrounded side of the battery 49. The relay actuates an armature 52 which is normally separated from but moved into engagement with a contact 53 when the core of the relay is active. The armature is connected in parallel with the shunt winding 50.

The relay and its battery are positioned at any convenient point. The connection by which current is conducted from the brush 46 to the relay comprises a jumper conductor 54 connected with a socketed head 55 which bears on the upper end of a bus bar 56, the latter passing centrally through but being insulated from the standard 57 on which the head 10 has a swivel mounting. Firm contact between the head 55 and the bus bar is secured through the medium of a bowed leaf spring 58 secured on the head 10 but exerting a downward pressure on the head 55 by reason of its connection with the latter between the insulating washers 59 with which the head 55 is equipped. By reason of this arrangement, the head 10 may swing to any position on its standard without affecting the electrical connection between the conductor 54 and the bus bar 56.

In operation, when the field system is rotated, as it will be by the action of the wind on the sails 42, current will be generated in the bobbins of the armature but this current will be alternating, although it is rectified by the commutating action of the segments of the collector rings, since with each change in direction of successive alternations, the brushes 46 and 47 will shift from one segment to the other, or rather the segments will change their positions under the brushes.

If the voltage of the generator be sufficient to charge the battery, it will first be effective on the shunt coil 50, functioning to depress the armature 52 and engage it with the contact 53. Then current can flow from the brush 46 over the armature and through the series coil 51 to the battery, returning through the ground connection. After the armature 52 has been depressed by action of the voltage coil 50, it will be maintained in such depressed position by the series coil 51 as long as the voltage of the generator is sufficient to charge the battery. But, should the generator voltage drop below normal, the battery will be taken off charge by the release of the armature and will then carry the line load. Thus, during periods of low voltage of the generator resulting from slow speed due to reduced wind pressure, the battery will care for the load on the line.

The invention having been described, what is claimed as new and useful is:

A generator of the kind indicated comprising a step cylindrical housing, means for stationarily mounting the same, a stud shaft fixed with respect to the housing, a rotor in surrounding relation to said shaft and formed with a shell encircling the shaft, anti-friction bearings interposed between the shell and the shaft, a series of bobbins disposed in the housing within the larger step of the latter and angularly spaced therearound with their axes parallel with the axis of said shaft, a series of permanent horse-shoe magnets carried by the rotor with their legs arranged radially thereof, so that they pass the bobbins on the side faces of their legs adjacent the free ends when the rotor rotates, a rectifier carried by the rotor within the smaller step of the housing, and brushes having holders mounted in but insulated from the housing at the smaller step, the brushes bearing radially on the rectifier.

CLAUD M. ROACH.